Nov. 22, 1955
H. KESLER ET AL
2,724,531
RUFFLE FORMING METHOD AND APPARATUS
Filed June 21, 1952
5 Sheets-Sheet 2
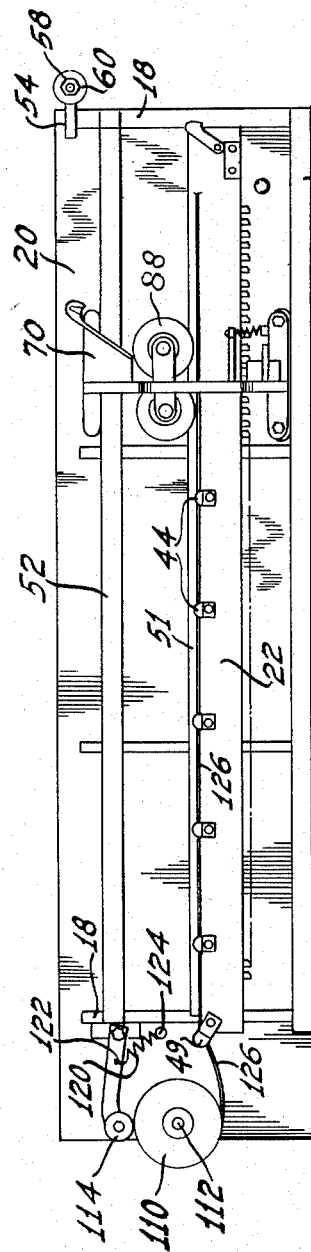
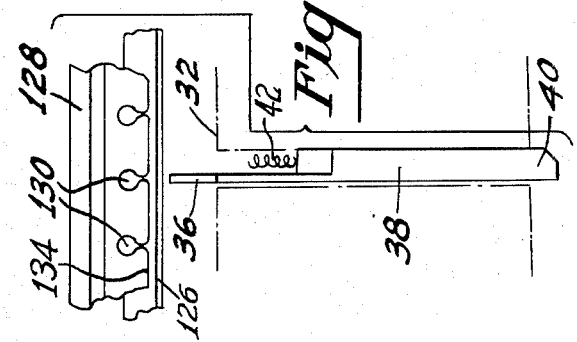
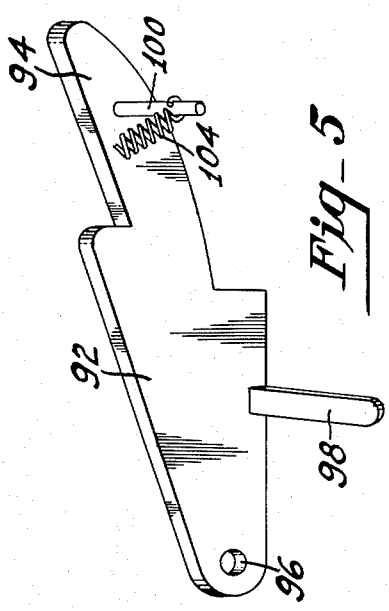
INVENTOR.
Herman Kesler &
Burton S. Morris
BY Harry Langsam
ATTORNEY

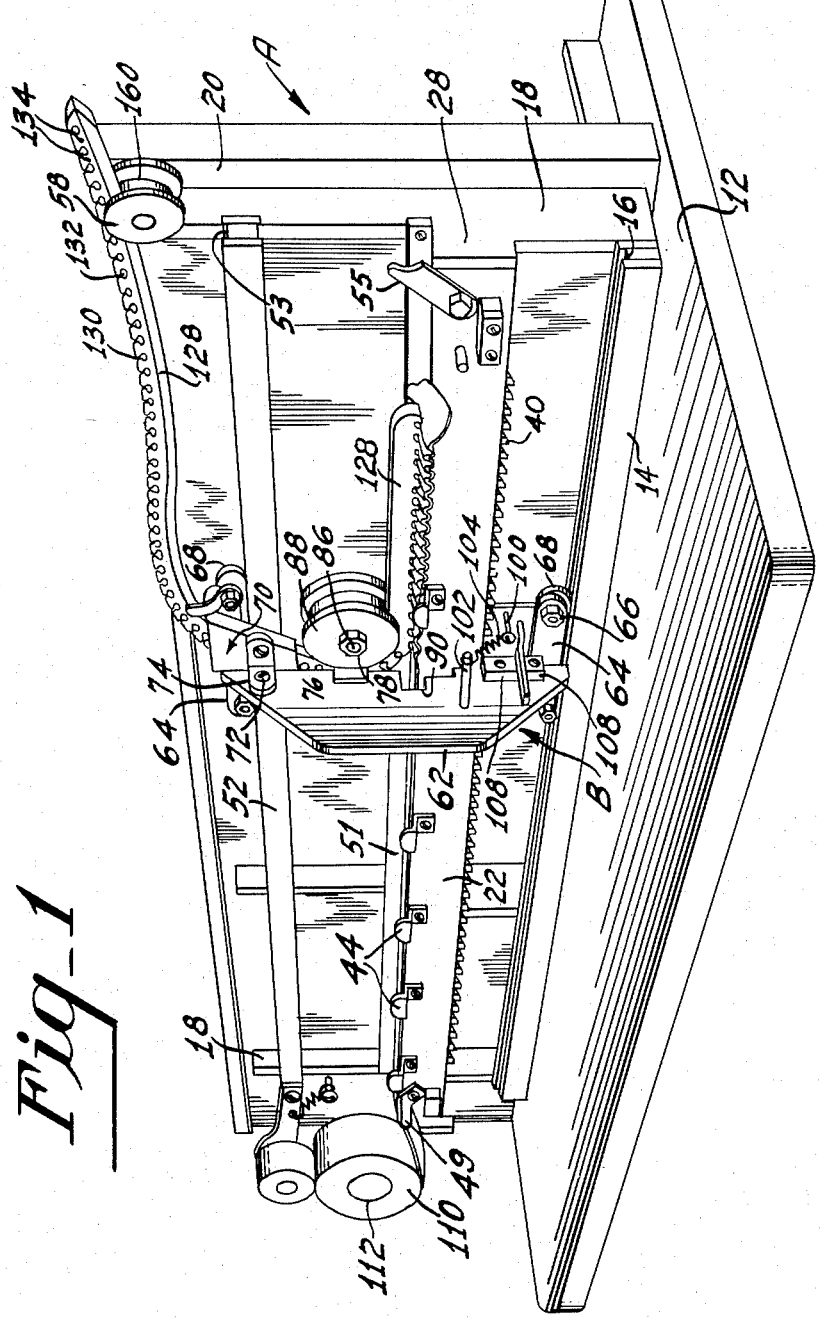
INVENTOR.
Herman Kesler &
Burton S. Morris

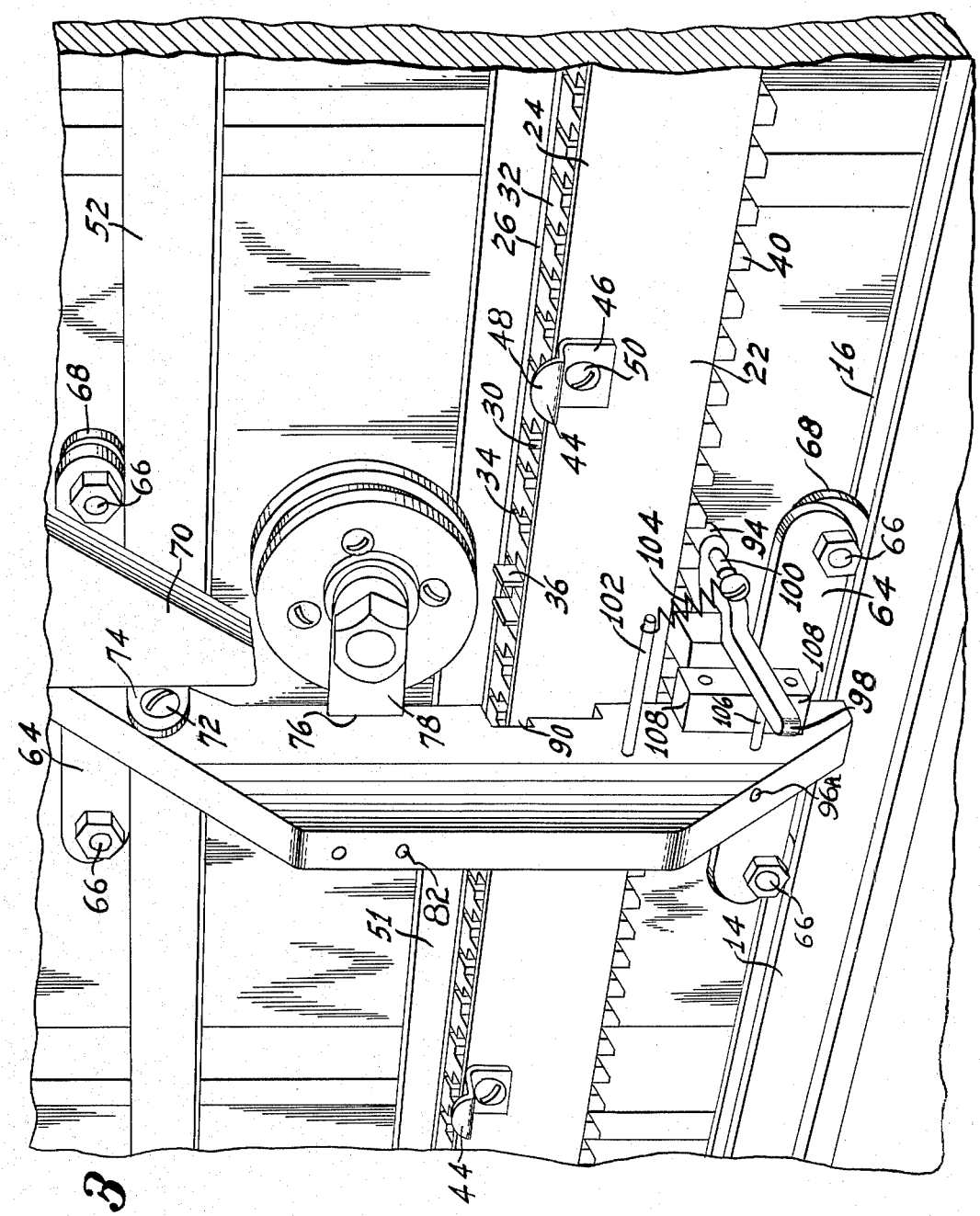

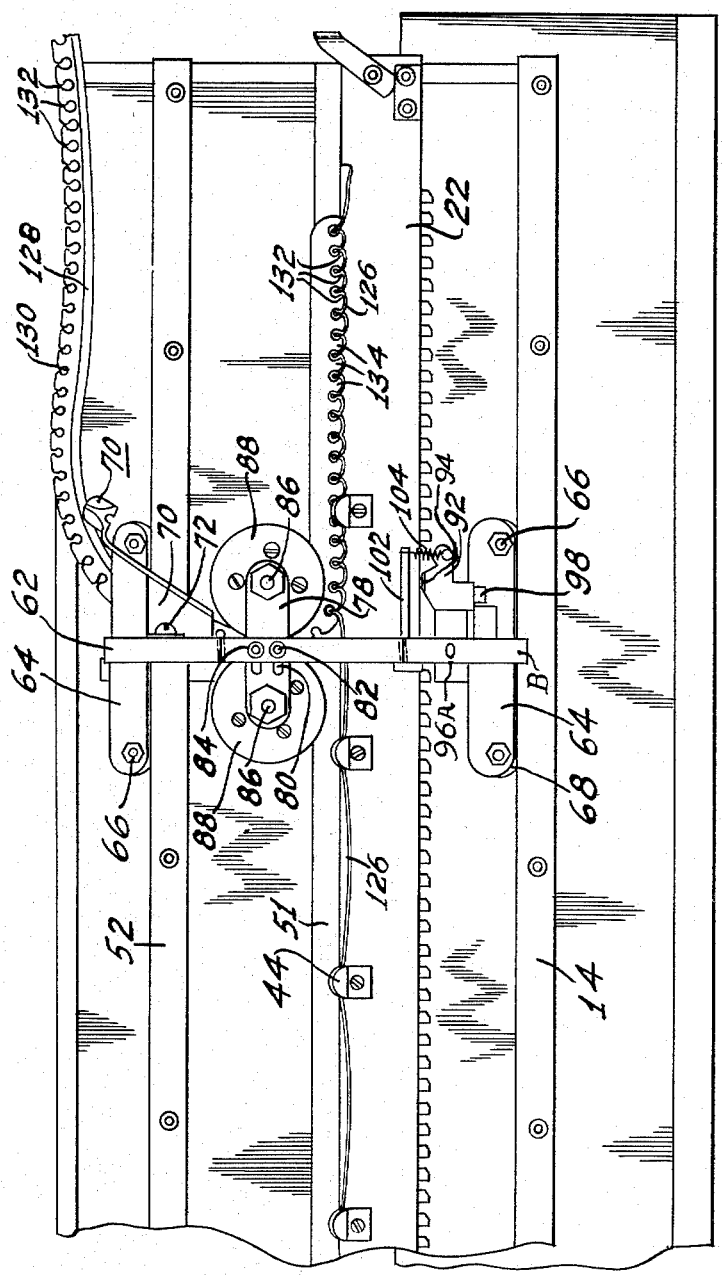

Nov. 22, 1955 H. KESLER ET AL 2,724,531
RUFFLE FORMING METHOD AND APPARATUS
Filed June 21, 1952 5 Sheets-Sheet 5
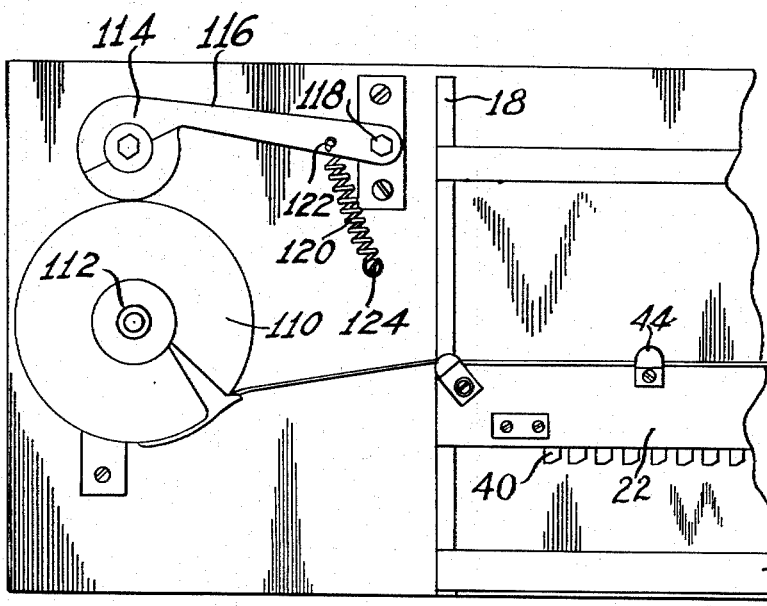
*Fig_9*
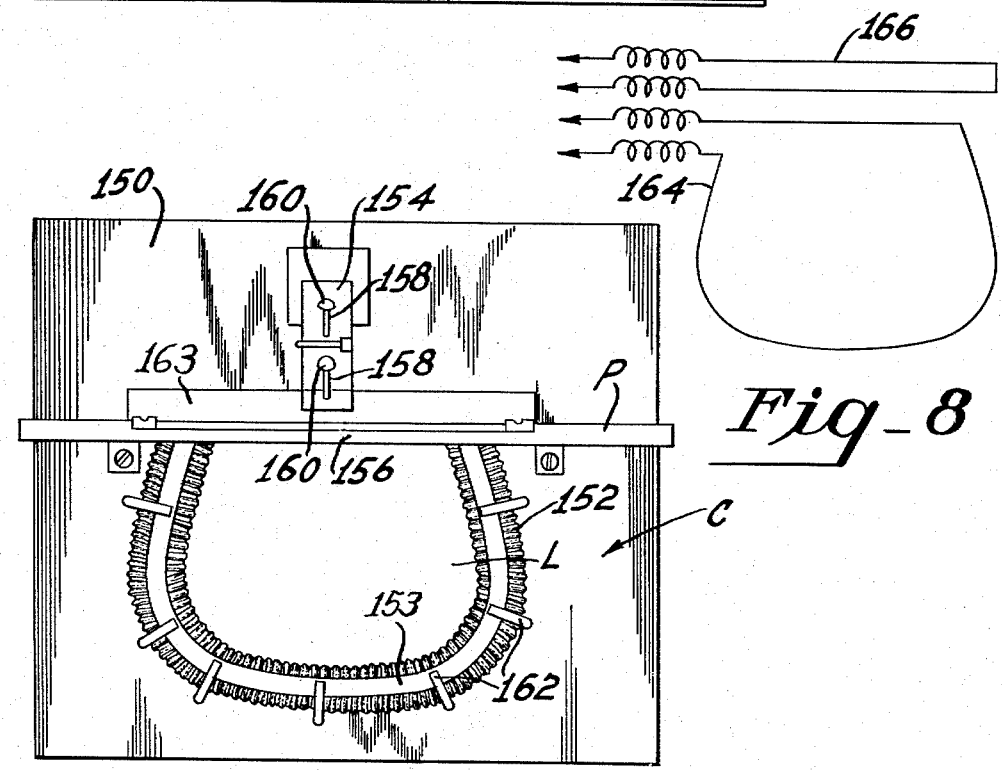
*Fig_8*
*Fig_7*
INVENTOR.
Herman Kesler AND
Burton S. Morris
BY Harry Langsam
ATTORNEY

United States Patent Office

2,724,531
Patented Nov. 22, 1955

2,724,531

RUFFLE FORMING METHOD AND APPARATUS

Herman Kesler, Philadelphia, Pa., and Burton S. Morris, Camden, N. J., assignors to American Metal Specialties Corporation, a corporation of Pennsylvania Application June 21, 1952, Serial No. 294,766

6 Claims. (Cl. 223—30)

This invention relates to a method and apparatus for forming a ruffle on a plastic body and particularly relates to such a method and apparatus which can be used to form a ruffled edging on a plastic apron, curtain, dress or the like.

The method generally consists of forming a preliminary ruffle on a strip of plastic tape and then heat sealing the tape to the plastic body at the same time that the ruffles are being permanently set. This method is carried out by an apparatus comprising a ruffle former device for the tape and a heat sealing device for securing the tape to the apron and permanently setting the ruffles all in one operation.

The apparatus generally consists of a base block having a series of perforations therein and a series of vertically reciprocating fingers in these perforations. The fingers are resiliently mounted and are adapted to be pushed up above the working surface of the base block by a cam means. The workpiece comprising a strip of plastic tape is placed over the working surface and a serrated or toothed gripper is placed upon the strip. The fingers are, thereafter, caused to be pushed upwards, bulging the areas of the strip around them. The fingers act, in this way, to press portions of the plastic strip into the recesses in the serrated gripper member. The teeth of the gripper member, being rubber, act to close around the bulged portions of the strip and pinch tightly against these portions of the strip after the fingers are withdrawn. The strip, which is now securely held in a pinched or ruffled position by the gripper member, is then transferred to a heat sealing machine where the ruffles are permanently set. This action takes place at the same time that the plastic strip is being heat sealed to the main body such as an apron, a curtain, a dress, or the like.

One object of our invention is to provide a simple and efficient method for mass producing a ruffled plastic article.

Another object of our invention is to provide an apparatus for preliminarily forming a ruffled effect in plastic material.

A further object of our invention is to provide an apparatus for quickly and easily setting the ruffled effect in the plastic into a permanent condition.

A further object of our invention is to provide an apparatus for both permanently setting the ruffles and adhering them to a plastic body in one simple operation.

Other objects of our invention are to provide an improved method and apparatus of the character described, that is easily and economically produced, which is sturdy in construction and which is highly efficient in operation.

With the above and related objects in view, our invention consists in the details of construction and combination of parts, as will be more fully understood from the following description, when read in conjunction with the accompanying drawings in which:

Fig. 1 is a perspective view of the ruffling machine.

Fig. 2 is a front view of the ruffling machine shown in Fig. 1.

Fig. 3 is an enlarged perspective view showing the relative positions of the presser roller and fingers.

Fig. 4 is a view showing the action of the presser roller on the gripper.

Fig. 5 is a perspective view of the cam assembly.

Fig. 6 is a perspective view showing the relation between the cam and the finger.

Fig. 7 is a top plan view of the lower heating plate of the sealing machine.

Fig. 8 is a bottom plan view of the upper heating plate of the sealing machine.

Fig. 9 is a view of the tape supply reel.

Referring now in greater detail to the drawings wherein similar reference characters refer to similar parts, we show in Fig. 1 a ruffling apparatus generally designated A which comprises a supporting stand 10 upon which is provided a base 12. Mounted on the base 12 is a track member 14 in the top of which is provided a channel 16. The track member 14 is attached at either end to vertically extending brackets 18, these brackets 18 being, in turn fastened to an upstanding wall 20 which is supported on the base 12.

Vertically spaced from the track member 14 and overlying it is a pusher key support or member 22 which is also attached at each end to the brackets 18. The member 22 comprises a pair of elongated parallel walls 24 and 26 connected at each of their ends by a wall 28. The top and bottom of the member 22 are left open to provide a central channel 30. In this channel 30 are provided a series of guide members 32 which are spaced from each other sufficiently to provide a series of thin slots 34. A thin plate-like finger or pusher key 36 is vertically reciprocable in each of these slots and this finger is mounted on the head of a pusher key 38 which has a lower portion 40. The portion 40 extends below the channel 30. A spring 42 resiliently holds each of the pusher keys and associated fingers in their respective slots between the guide members 32. A series of tape guides 44 are fastened to the outer wall 24 of the member 22, these guides comprising a straight portion 46 and an off-set portion 48. A screw 50 holds each guide on the wall 24. An angularly placed starter guide 49 is provided at the feeding end of the member 22. A guide bar 51 is mounted in parallel relation to the guide members 44, this bar 51 being attached at each end to brackets 18 with its bottom surface flush with the top surface of member 22.

Spaced above the member 22 is a track member 52 similar to the track member 14. This upper track member 52 is provided with a channel 53 and is also attached at either end to the brackets 18.

A roller support member 54 is mounted on the top of one of the brackets 18 by a bolt 56, and journaled in the support member 54 is a shaft 58. A grooved roller 60 is rotatably mounted on the shaft 58.

A carriage B is mounted on the machine for reciprocating movement, the mechanism comprising a vertical support 62 at the top and bottom end of which is provided a bar 64. Each bar 64 is provided with a shaft 66 at each end and upon each of the shafts 66 is rotatably mounted a roller 68. The rollers 68 ride in their respective channels 16 and 53. A guide housing 70 is attached to the top portion of the carriage 62 by means of a screw 72 passing through a lug 74 formed on the housing 70. The housing includes a guide arm 70 on which a gripper strip 128 may lie. The guide housing 70 functions as a funnel to enable the flexible gripper strip 128 to pass between the spaced grooved wheels 88, 88 which lie in the same vertical plane. The guide housing 70 which has the inclined wall 70 tapered towards the bottom opening of the guide housing prevents the flexible gripper strip from tangling and as the roller 88 presses the grip strip 128 down upon the top of the pusher key support or member 22 thereby opening some of the slots or recesses 132, meanwhile the cam 94 pushes the pusher key 38 upwardly thereby inserting the surrounding portions of the plastic into the appropriate recess.

A slot 76 is formed in the inner edge of the member 62 and in this slot is adjustably positioned a bar 78, the bar 78 having a pair of slots 80 through which pass a pair of studs 82, the studs being provided with nuts 84 for holding the studs in adjusted position within the slots. A shaft 86 is journaled on either end of the bar 78 and on each shaft 86 is rotatably mounted a peripherally grooved roller 88. Each of the rollers 88 overlies and is spaced a predetermined distance from the top surface of the member 22. A slot 90 is centrally located on the inner edge of the carriage 62 adjacent the top surface of the member 22 to allow a laterally overhanging workpiece to pass by the carriage.

The cam mechanism for actuating the fingers is mounted on the lower portion of the carriage and comprises a cam body 92 having a cam portion 94. The cam body is pivoted to the carriage as at 96 and a lever projects from the cam body as at 98. A rod 100 projects laterally out from the cam portion 94 and a rod 102 projects laterally out from the member 62. A spring 104 is connected at one end to the rod 100 and at the other end to the rod 102. The spring 104 tends to pull the cam portion 94 upwardly around the pivot 96 toward engagement with portion 40 of key 38. The lever 98 is normally held within a slot 106 formed by a pair of spaced blocks 108. However, when it is desired to disengage the cam from contact with the pusher keys, the lever 98 is disengaged from the slot 106 and pushed down, thereby causing the cam portion 94 to rock about the pivot 96.

At one end of the machine and spaced from the track members is located a spool 110 mounted on a spindle 112. The spool holds a rolled up strip of plastic tape. The roller 114 mounted on an arm 116 which is pivoted at 118 is provided for the purpose of keeping the plastic strip tightly rolled on the spool while the machine is in operation. The arm 116 is biased downwardly by a spring 120 which is connected at one end to the arm as at 122 and at the other end to a laterally extending rod 124.

In operation, the spool 110 holding the plastic tape 126 is placed on the spindle 112, the roller 114 thereafter acting to resiliently press down on the tape. The end of the tape is then passed over the guide 49 and along the top of the member 22 between the guides 44 and the guide bar 51 to a stop 55. The strip of tape thereby rests on top of the guide members 32 and beneath the rollers 88. A flexible gripper strip 128 of rubber or the like, having a serrated face 130 comprising slots or recesses 132 and teeth 134, is then passed over the grooved guide pulley 60 and through the guide housing 70 above roller 88. The end of the gripper strip is then pulled through the space between the right hand roller 88 and the plastic tape which is positioned on top of the member 22. The end of the gripper strip is also pulled up to the stop 55 which allows the recesses 132 in the gripper strip to coincide with the fingers 36 in a vertical plane, thereby allowing the first finger to hook into the first slot when the carriage moves.

The carriage B which operates only from right to left, as viewed in Fig. 1, when in the working position, is then set in starting position at the extreme right. This carriage carries and feeds the gripper strip along the machine and, at the same time, operates the cam means for pushing up the fingers. As the carriage moves from right to left, the right-hand roller 88 keeps pulling down more and more of the gripper strip and, at the same time, shapes the gripper strip around the roller. The roller also presses down on the gripper strip, thereby opening some of the slots or recesses 132. Simultaneously the cam portion 94 pushes the coinciding fingers upwards against the tension of the springs 42. These fingers act to insert the surrounding portions of the plastic type into the appropriate recesses. As the carriage passes, the springs 42 pull the fingers back to their original position. The flexible material out of which the gripper strip is formed then acts to close up the slots or recesses 132 about the inserted plastic type in a pinching action. This pinching action holds the inserted plastic tape in place at the end of the run. The tape in the gripper strip is then cut free from the spool, being now ready for the heat-sealing process and removed from the machine. The cam release finger 98 is then released from the slot 106 and pulled down to rock the cam 92 about the pivot 96, thereby releasing the cam from contact with the pusher keys 38, and allowing the carriage to be pulled back to its starting position on the right.

If during the movement of the carriage during its working operation, an error is made, or it is otherwise desired to go back over a part of the work, the lever 98 is actuated as above to release the cam and the carriage is pulled back the required distance. During this backward movement, the left-hand roller 88 acts to press down on the gripper strip, thereby opening the recesses 132 and allowing the pinched portions of the tape to fall out.

After the tape in the gripper strip is cut free, it is transferred to the heat-sealing apparatus C. This apparatus comprises a lower flat plate 150 having a recess 152 therein of the size and shape of the finished article. In the apparatus illustrated in the drawings, the article to be worked on is shown as a plastic apron. However, this is merely for illustrative purposes since any size or shape or plastic article may be produced by this device merely by varying the size and shape of the recess 152. In the apparatus illustrated in Fig. 7, the plastic band P which is to serve as the tie string of the apron is positioned across the top of the plate. Then the plastic body L of the apron is placed in the recess 152 with the top of the apron overlapping the plastic band. The gripper strip 153 with the plastic ruffle is then placed around the apron body with a portion of the ruffle overlapping the apron. Reference is made to the device as illustrated in Fig. 8 of the drawings wherein the plastic body of the apron is designated as L. A slide 154 has an upper metal plate 163 which is insulated from a lower metal plate 150. The upper plate 163 has a recess 156 therein in which the plastic band P passes and which plate 163 presses the band against apron body L. The upper plate 163 is affixed to the quick detaching slide 154 that has a pair of longitudinal guide slots 158, 158 through which extend a pair of holding pins 160. The holding pins 160 cause the slide 154 and its upper plate 163 to press upon and hold the plastic band to the apron body. The electrical circuit 166 may be completed through the plates 150 and 163 to heat seal the plastic band to the plastic body. The second electric circuit 164 is connected to heat seal the ruffles to the plastic body. A plurality of spring fingers 162 spaced around the periphery of the recess 152 hold the gripper strip and the plastic tape in place. The upper plate 163 having the sealing electrodes is then brought down over the lower plate C and the current is turned on. The electrodes provide a line seal between the ruffle and the plastic apron body, thereby also permanently sets the ruffles, since the line seal, by gathering the ruffles together at one edge, allows them to flare out in ruffled position at the other edge.

Although our invention has been described in considerable detail, such description is intended as being illustrative rather than limiting, since the invention may be variously embodied and the scope of the invention is to be determined as claimed.

We claim as our invention:

1. The method of making a ruffled plastic article which comprises the steps of forming a series of folds by forcing portions of a plastic strip between the teeth of a flexible toothed member, heat sealing said strip to a preformed plastic body by a line seal which crosses said folds and, thereafter, removing said toothed member from said strip.

2. A ruffling device comprising a frame, a pair of parallel track members on said frame, said track members being vertically spaced from each other, an elongated work supporting member being part of said device and positioned midway between said track members, a longitudinal groove in said work supporting member, a plurality of spring-pressed fingers in said groove, and a vertically extending carriage being part of said device and having rollers on opposite ends, said rollers being adapted to ride on said track members, said carriage being further provided with a cam member, said cam member being adapted to individually raise each of said fingers against the tension of their respective springs during the movement of said carriage along said work supporting member.

3. A ruffling device comprising an elongated work support, a longitudinal groove in said work support, a series of spring-pressed fingers in said groove, a carriage being part of said device and being adapted to move along said work support, a cam member on said carriage, said cam member underlying said fingers and being adapted to individually raise said fingers above the work supporting surface of said work support, a roller mounted on said carriage, said roller being vertically spaced from said cam member and overlying said work supporting surface, said roller being adapted to press a flexible toothed strip down against a workpiece held on said work support surface.

4. The device of claim 3 wherein a spindle is provided adjacent one end of said work support for the purpose of mounting a spool thereon and wherein a spring-pressed roller is provided adjacent said spool for the purpose of pressing against the material carried on said spool.

5. The method of forming ruffles in a plastic strip comprising the steps of forcing portions of said strip between the teeth of a flexible toothed member, forming a line seal along one edge of said strip while said strip is still held by said toothed member and, thereafter, removing said toothed member from said strip, and wherein said line seal is caused by laying a heating element along said strip.

6. A machine for use to form ruffles on a plastic like fabric comprising an elongated work support, a plurality of vertically positioned grooves in said support, a plurality of spring pressed pusher fingers wherein each finger is located within and slidable within one of said grooves, a flexible strip having gripping teeth on one side thereof adapted to be laid upon said grooves with the gripping teeth side to lie adjacent said grooves, a roller adapted to press upon said strip and to roll along said work support, a cam member connected to said roller and being adapted to press one of said fingers between said gripping teeth of said tooth like strip.

References Cited in the file of this patent

UNITED STATES PATENTS

| | | |
|---|---|---|
| 1,925,146 | Loeb | Sept. 5, 1933 |
| 2,136,092 | Troy | Nov. 8, 1938 |
| 2,243,635 | Karasiewicz | May 27, 1941 |
| 2,438,685 | Stevens | Mar. 30, 1947 |
| 2,494,642 | Case | Jan. 17, 1950 |
| 2,513,777 | Andre | July 4, 1950 |
| 2,520,787 | Sherman | Aug. 29, 1950 |
| 2,551,808 | Minns | May 5, 1951 |
| 2,555,409 | Hosfield | June 5, 1951 |
| 2,579,063 | Andrews | Dec. 18, 1951 |
| 2,589,756 | Waters | Mar. 18, 1952 |